United States Patent
Kihara

(10) Patent No.: US 6,786,410 B2
(45) Date of Patent: Sep. 7, 2004

(54) CARD CONNECTING UNIT PROVIDED WITH LOADING MECHANISM

(75) Inventor: Takashi Kihara, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/299,520

(22) Filed: Nov. 18, 2002

(65) Prior Publication Data

US 2003/0102371 A1 Jun. 5, 2003

(30) Foreign Application Priority Data

Dec. 5, 2001 (JP) ........................................ 2001-371095

(51) Int. Cl.[7] ................................................. G06K 7/00
(52) U.S. Cl. .......................... 235/453; 235/475; 235/480
(58) Field of Search ................................. 235/475–482, 235/453, 445, 448; 439/131, 151–153, 159

(56) References Cited

U.S. PATENT DOCUMENTS

| | | | |
|---|---|---|---|
| 5,033,972 A | * | 7/1991 | Komatsu et al. ............ 439/153 |
| 5,146,069 A | * | 9/1992 | Orimoto et al. ............ 235/475 |
| 5,879,175 A | | 3/1999 | Muramatsu et al. |
| 6,315,583 B1 | * | 11/2001 | Nishioka ..................... 439/131 |
| 6,508,402 B1 | * | 1/2003 | Takada et al. .............. 235/451 |

FOREIGN PATENT DOCUMENTS

JP 2002252060 A * 9/2002

* cited by examiner

*Primary Examiner*—Karl D. Frech
*Assistant Examiner*—Jamara A. Franklin
(74) *Attorney, Agent, or Firm*—Beyer Weaver & Thomas, LLP

(57) ABSTRACT

A loading mechanism of this invention that draws a card into a body unit and ejects the card outside of the body unit is so constructed as to include a movement member that moves to a drawing direction and an ejecting direction of the card by means of power of a drive motor, and an engagement member provided to the movement member so as to engage with and disengage from a recess of the card. In this construction, the engagement member is engaged with a recess of the card to thereby move the card together with the movement member to the drawing direction and the ejecting direction.

5 Claims, 15 Drawing Sheets

CARD CONNECTING UNIT PROVIDED WITH LOADING MECHANISM

BACKGROUND OF THE INVENTION

1. Field of the Invention

The present invention relates to a card connecting unit that makes connection with a card having contacts, specifically to a card connecting unit capable of drawing and ejecting the card by a loading mechanism.

2. Description of the Related Art

Some card connecting units for connecting a card such as the IC card to equipment such as a computer provide a loading mechanism that automatically conveys a card inserted from a card insertion slot into the body of the unit.

This loading mechanism is made up such that, when the card is inserted into the card insertion slot, a motor rotates a carriage roller provided on the upper side of a card path or provided on both the upper and lower sides with the card path placed in between to draw the card into the body of the unit along the card path, and when a recording or reproducing of information to or from the card is completed, the motor reversely rotates the carriage roller to return the card to the card insertion slot, and to eject it outside the body of the unit.

However, in the above conventional card connecting unit, the loading mechanism is made up to provide the carriage roller on the upper side of the card path or on both the upper and lower sides with the card path placed in between; accordingly, the vertical size of the card connecting unit becomes increased by the space for providing the carriage roller, which makes it impossible to make the card connecting unit thinner.

SUMMARY OF THE INVENTION

The invention has been made in view of the above circumstances of the conventional technique, and an object of the invention is to provide a thin-type card connecting unit provided with the loading mechanism for drawing and ejecting the card.

According to the most essential aspect of the invention, the card connecting unit includes: a loading mechanism that draws a card inserted in a card insertion slot into a body unit and ejects the card drawn into to the outside of the body unit from the card insertion slot; a drive motor that drives the loading mechanism; and a plurality of terminal members that come in contact with a plurality of contacts of the card drawn into the body unit by the loading mechanism. Along with the above constituents, the loading mechanism includes a movement member that moves to a drawing direction and an ejecting direction of the card by means of power of the drive motor, and an engagement member provided to the movement member so as to engage with and disengage from a recess of the card; and the engagement member is engaged with the recess of the card to thereby move the card together with the movement member to the drawing direction.

According to another aspect of the invention, the engagement member is provided rotatably around a pivot, on one end thereof a pawl to engage with the recess of the card is formed with the pivot placed in between, on another end thereof a fitting part to fit a groove formed on the movement member is formed, and an energizing member is provided which energizes the engagement member to a direction such that the pawl disengages from the recess; and when the fitting part is pressed by a front end of the card inserted into the card insertion slot, the engagement member turns to a direction such that the pawl engages with the recess against an energizing force of the energizing member.

According to another aspect of the invention, the loading mechanism includes a fixed plate fastened to the body unit, and the fixed plate includes a guide groove to extend to the drawing direction, which the pivot is fit into, as well as a cum groove and a lock groove with which the fitting part is engaged in a state of the card being ejected, which are formed in a row along the guide groove; when the fitting part is pressed by the front end of the card inserted into the card insertion slot, the fitting part disengages from the lock groove to move to the guide groove, and when the movement member moves to the drawing direction by a force to insert the card, the fitting part and the pivot move to the drawing direction along the guide groove; and when the pivot passes through the cam groove, the pawl moves to a direction such that it engages with the recess of the card, and engages with the recess.

According to another aspect of the invention, the fitting part is energized by the energizing member in a state of the card being ejected, and is located on a card path inside the body unit, when the card is correctly inserted into the card insertion slot, by being pressed on a slant of the front end of the card, the fitting part moves to a direction such that it deviates from the card path, which permits insertion of the card, and when the card is wrongly inserted, the fitting part comes in contact with the front end of the card to obstruct insertion thereof.

According to another aspect of the invention, the card connecting unit further includes: a rack gear provided movably in a body with the movement member; a loading gear engaged with the rack gear and driven to rotate by the drive motor, which moves the movement member to the drawing direction; a damping mechanism that presses to move the movement member by a predetermined distance to the drawing direction by the card inserted into the insertion slot; and a switch that detects the predetermined amount of movement of the movement member to start the drive motor.

DETAILED DESCRIPTION OF THE PREFERRED EMBODIMENT

Figure 1:
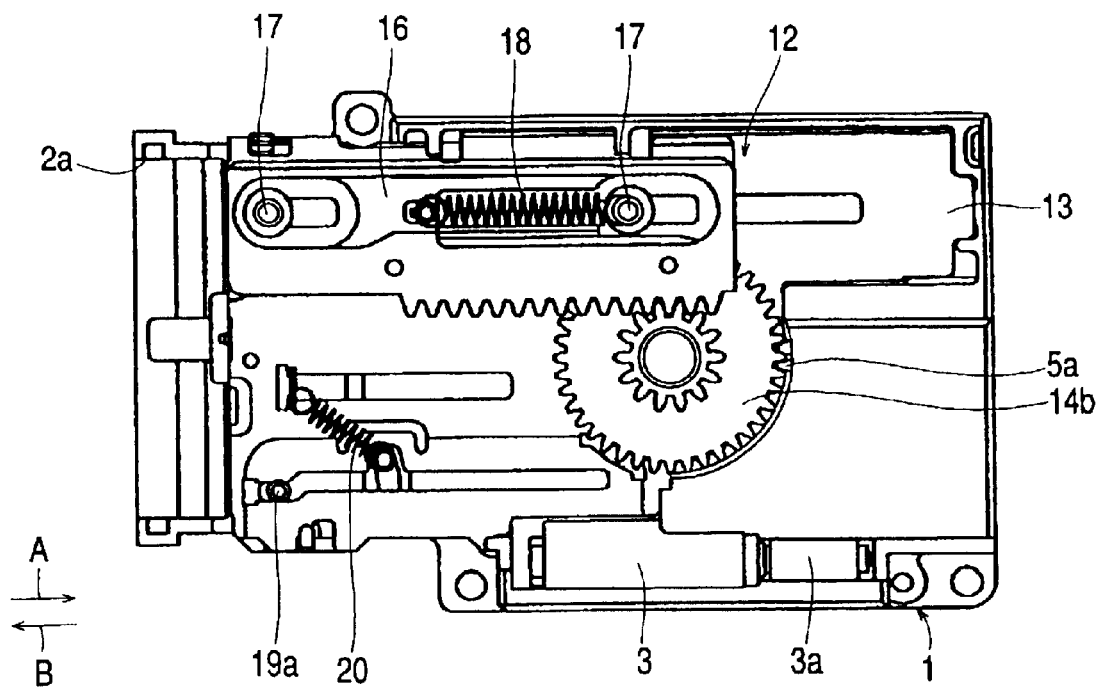
FIG. 1 is a plan view of a card connecting unit relating to the embodiment of the invention.
Figure 2:
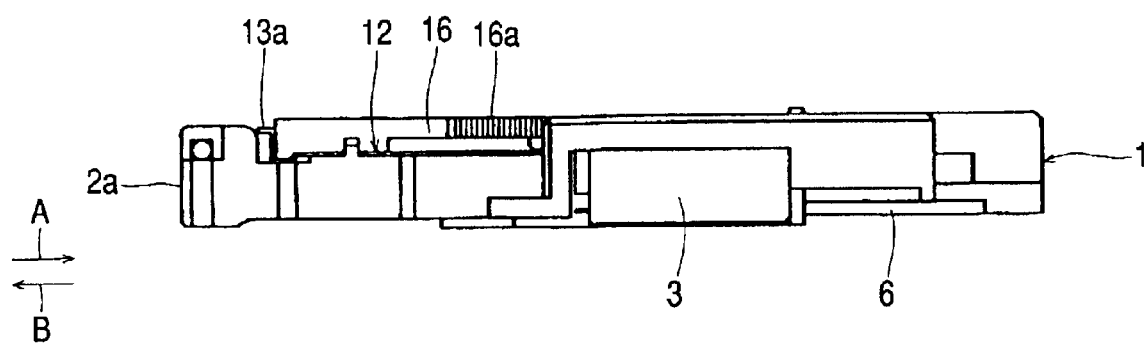
FIG. 2 is a side view of the card connecting unit.
Figure 3:
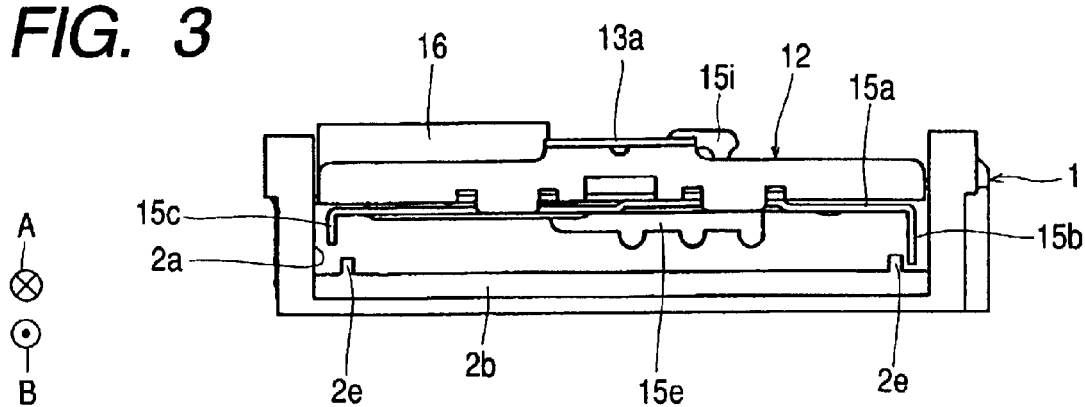
FIG. 3 is a front view of the card connecting unit.
Figure 4:
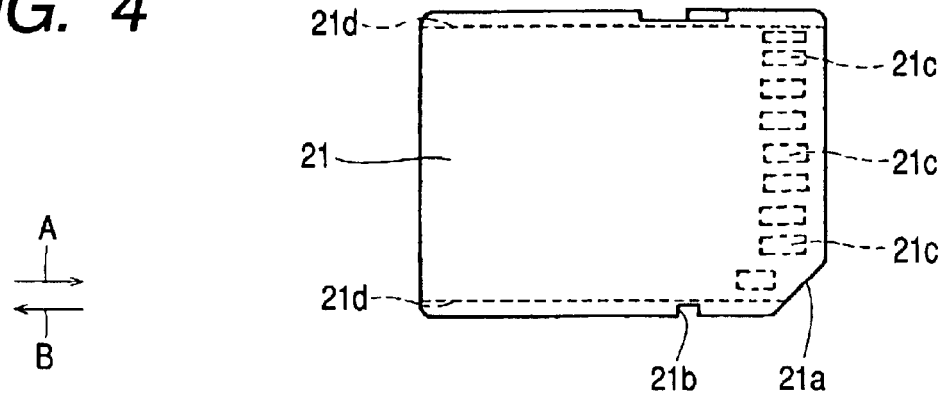
FIG. 4 is a plan view of a card.
Figure 5:
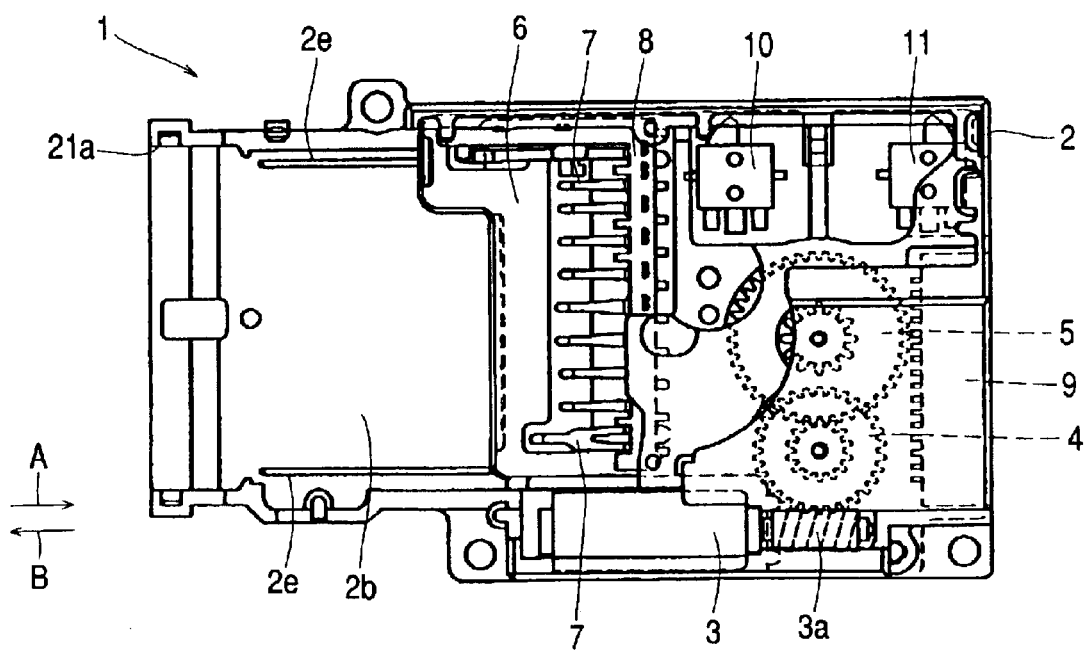
FIG. 5 is a plan view of a body unit provided to the card connecting unit.
Figure 6:
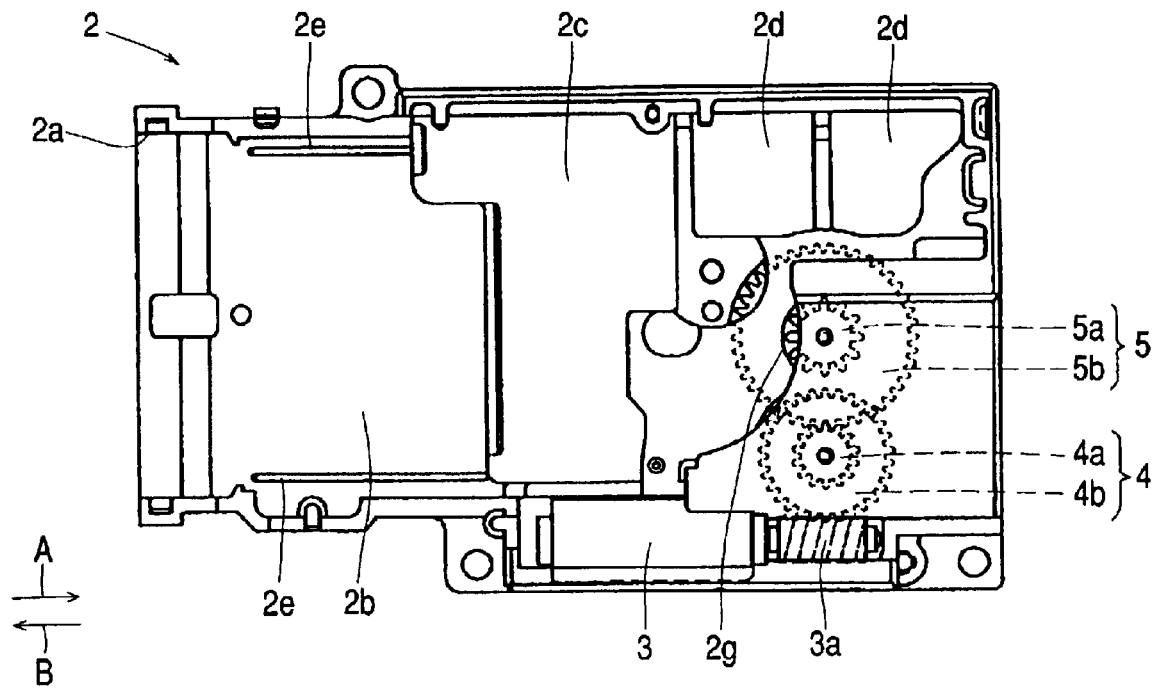
FIG. 6 is a plan view of a housing provided to the body unit.
Figure 7:
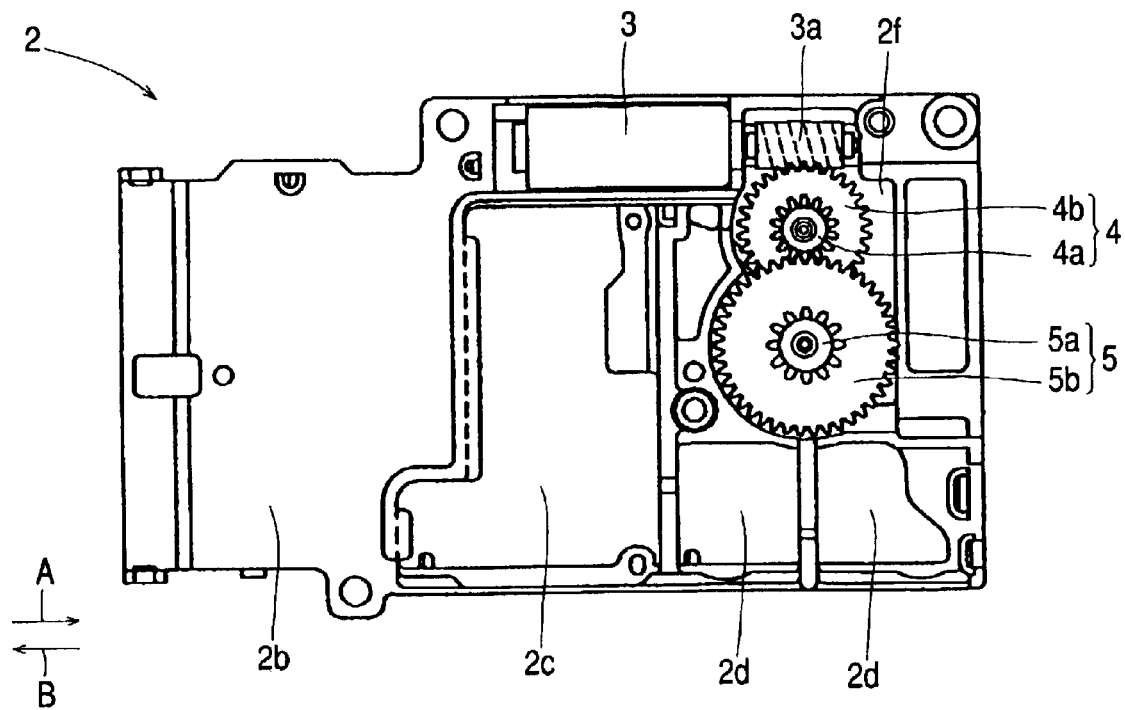
FIG. 7 is a bottom view of the housing.
Figure 8:
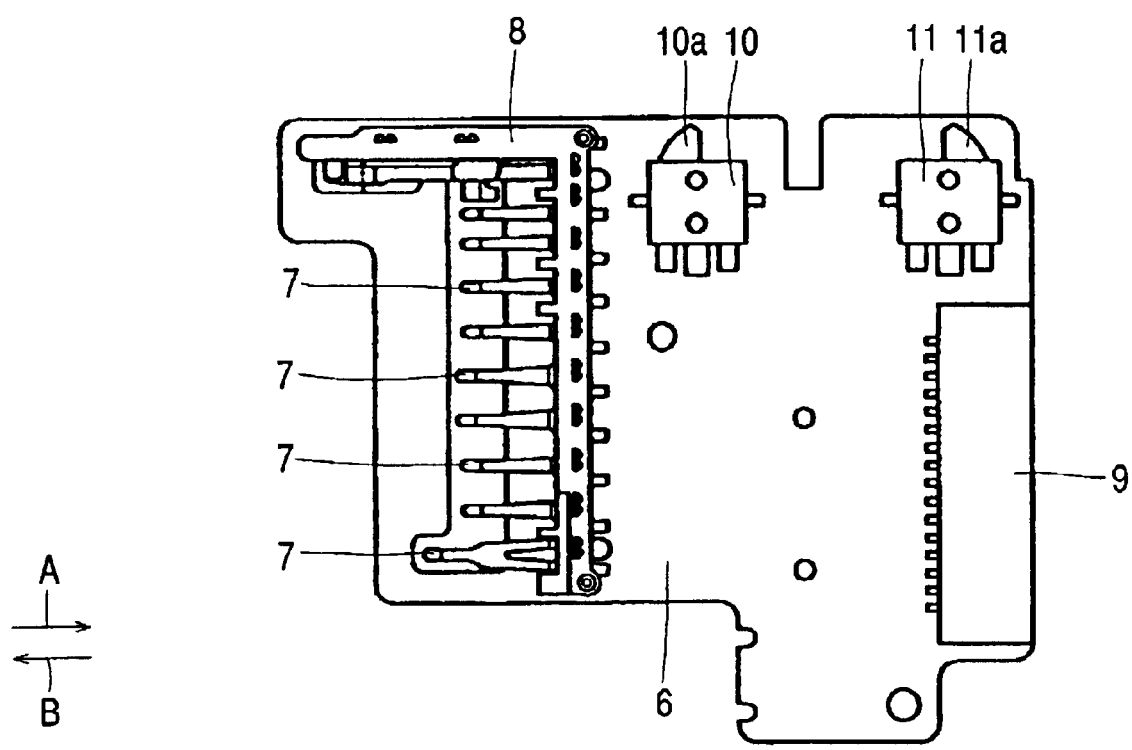
FIG. 8 is a plan view of a board provided to the body unit.
Figure 9:
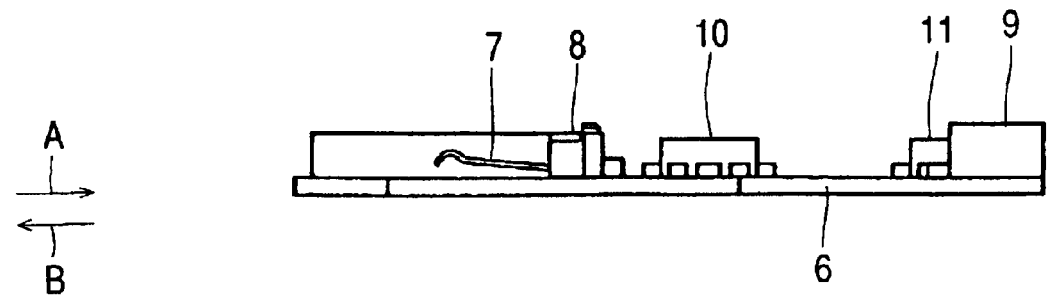
FIG. 9 is a side view of the board.
Figure 10:
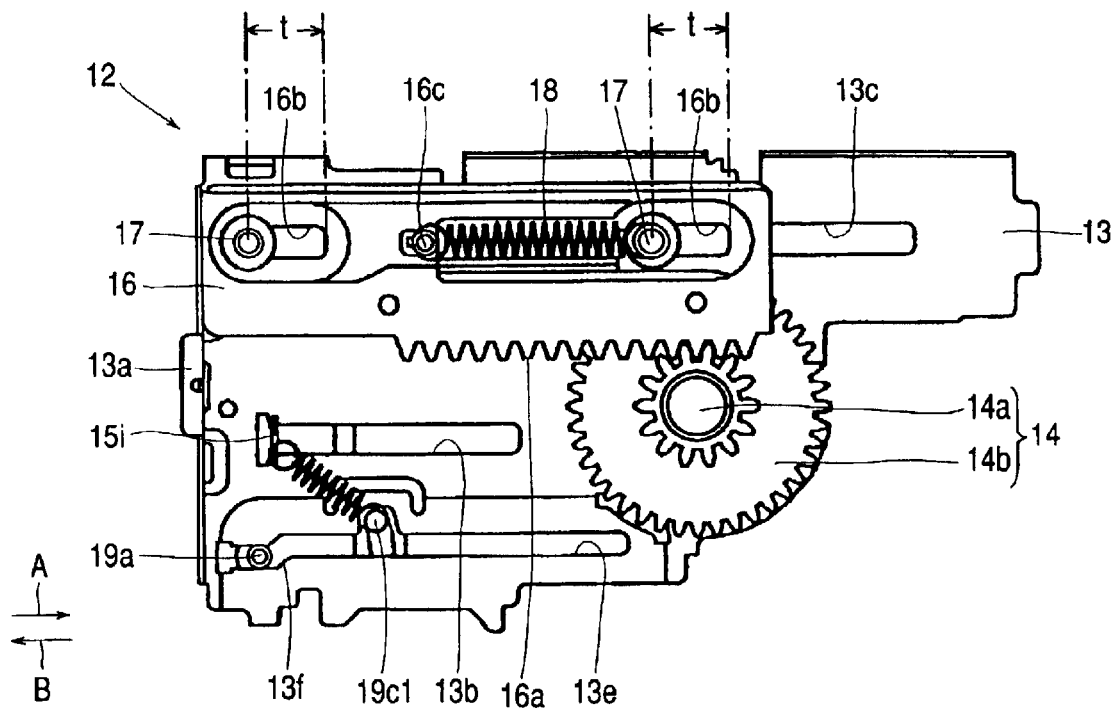
FIG. 10 is a plan view of a loading mechanism provided to the card connecting unit.
Figure 11:
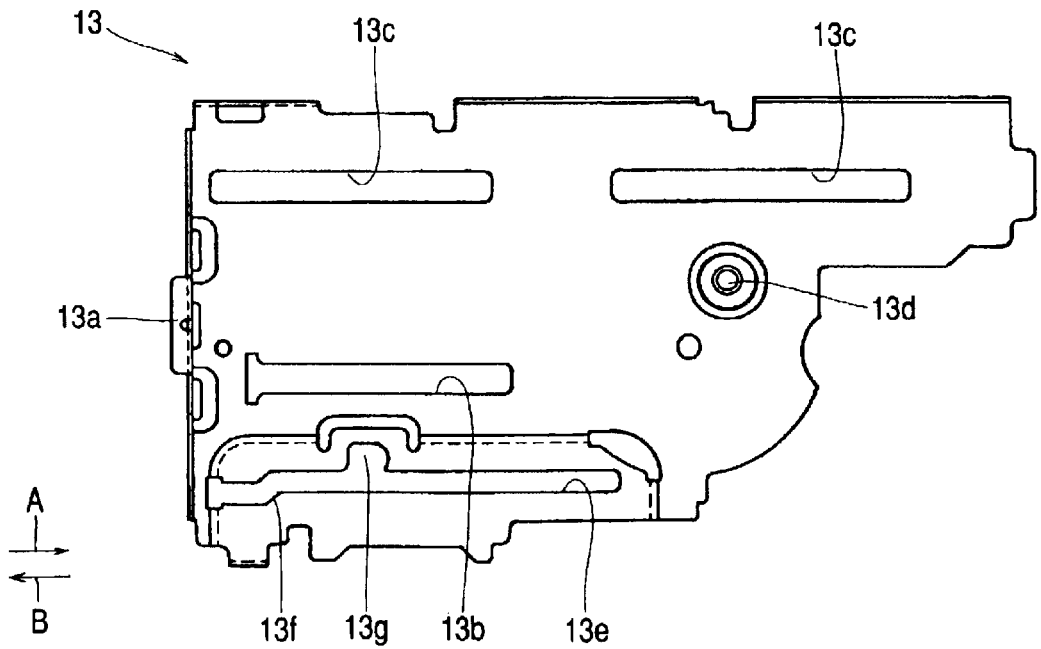
FIG. 11 is a plan view of a fixed plate provided to the loading mechanism.
Figure 12:
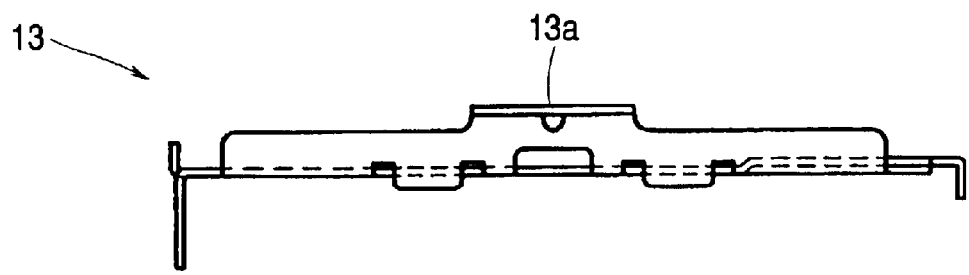
FIG. 12 is a front view of the fixed plate.
Figure 13:
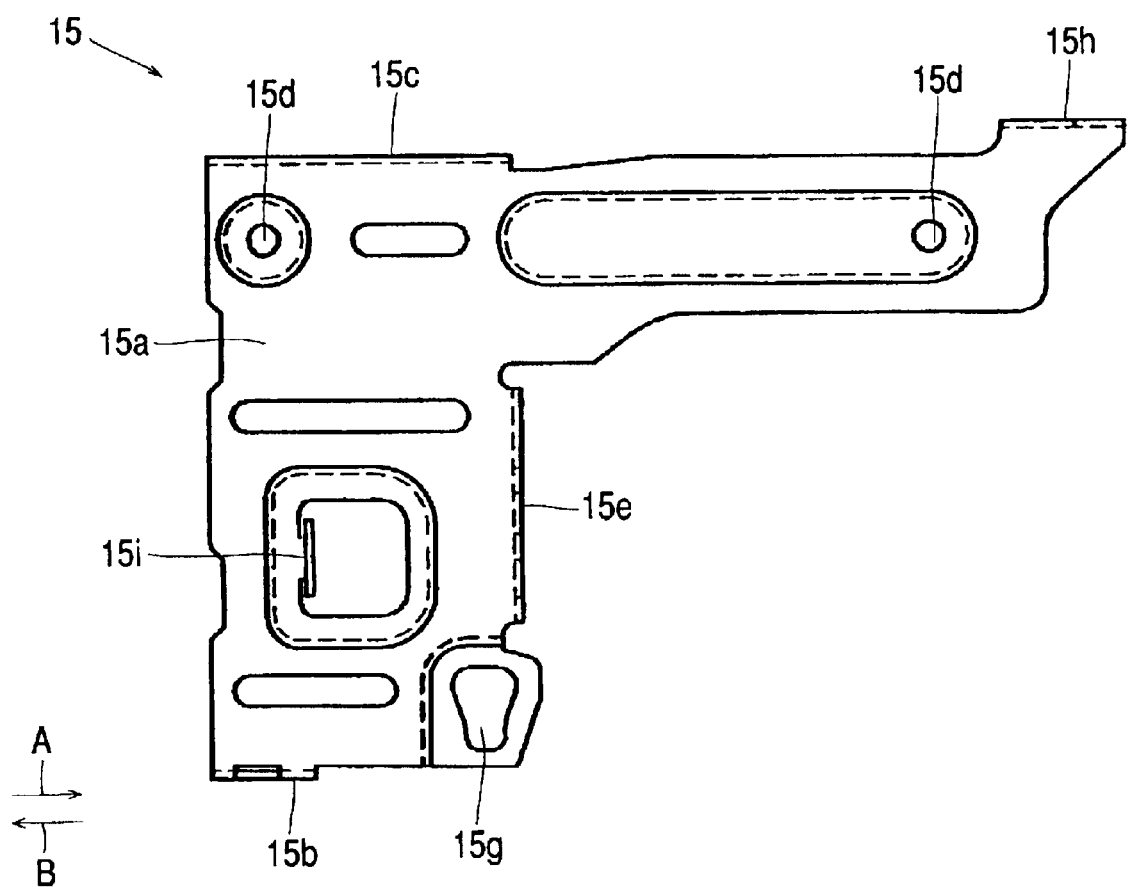
FIG. 13 is a plan view of a movement member provided to the loading mechanism.
Figure 14:
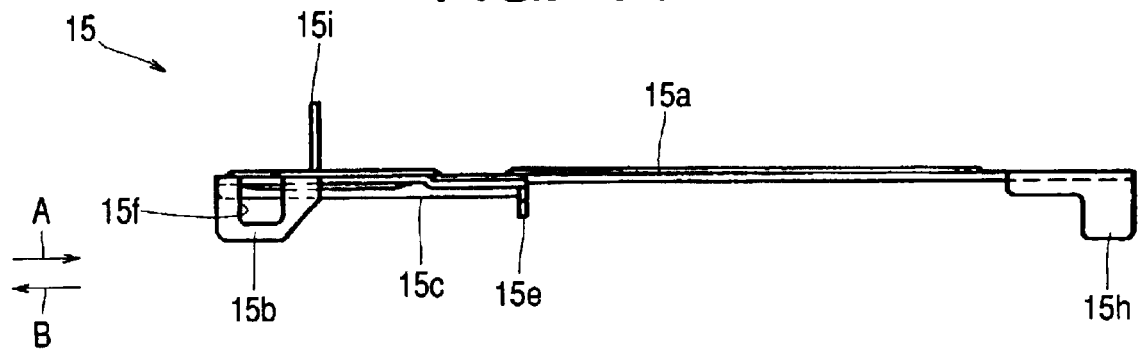
FIG. 14 is a side view of the movement member.
Figure 15:
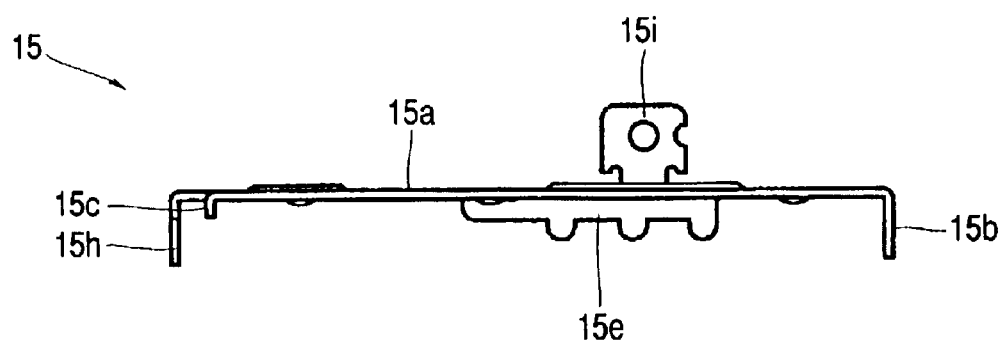
FIG. 15 is a front view of the movement member.
Figure 16:
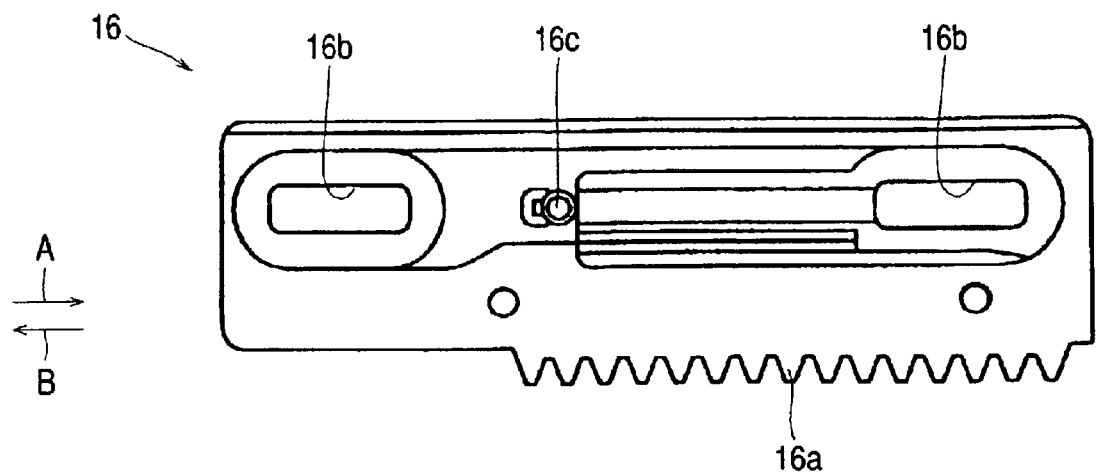
FIG. 16 is a plan view of a drive member provided to the loading mechanism.
Figure 17:
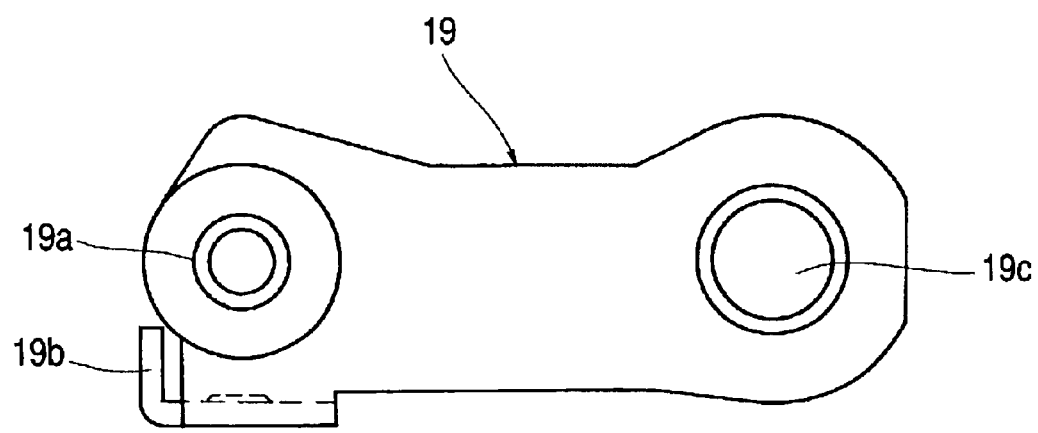
FIG. 17 is a plan view of an engagement member provided to the loading mechanism.
Figure 18:
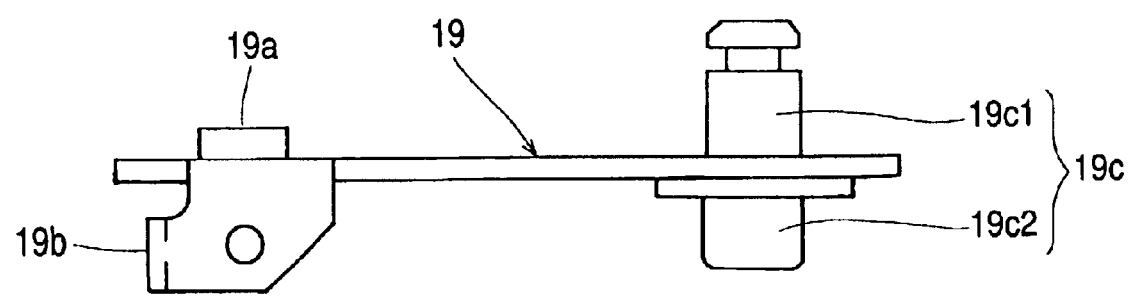
FIG. 18 is a side view of the engagement member.

The embodiment of a card connecting unit according to the invention will be described on the basis of the accompanying drawings. FIG. 1 through FIG. 32 are the drawings to explain the embodiment of the invention, in which FIG. 1 is a plan view of the card connecting unit relating to the embodiment of the invention; FIG. 2, a side view of the card connecting unit; FIG. 3, a front view of the card connecting unit; FIG. 4, a plan view of a card; FIG. 5, a plan view of a body unit provided to the card connecting unit; FIG. 6, a plan view of a housing provided to the body unit; FIG. 7, a bottom view of the housing; FIG. 8, a plan view of a board provided to the body unit; FIG. 9, a side view of the board; FIG. 10, a plan view of a loading mechanism provided to the card connecting unit; FIG. 11, a plan view of a fixed plate provided to the loading mechanism; FIG. 12, a front view of the fixed plate; FIG. 13, a plan view of a movement member provided to the loading mechanism; FIG. 14, a side view of the movement member; FIG. 15, a front view of the movement member; FIG. 16, a plan view of a drive member provided to the loading mechanism; FIG. 17, a plan view of an engagement member provided to the loading mechanism; FIG. 18, a side view of the engagement member; and FIG. 19, an explanatory chart illustrating the positional relation of the movement member and the engagement member in a state of the card being ejected.

As shown in FIG. 3 through FIG. 3, the card connecting unit relating to the embodiment is made up with a body unit 1 and a loading mechanism 12 supported on the upward opening end of the body unit 1 and so forth. As described later, the loading mechanism 12 draws the card inserted in a card insertion slot 2a into the body unit 1, returns the card drawn into back to the card insertion slot 2a, and ejects it out of the body unit 1.

A card 21 used for this card connecting unit is well known, and it is made up with electronic components such as ICs that are incorporated in a hard plastic case. As shown in FIG. 4, the card 21 has a slant 21a formed on one of the front corners, and has a recess 21b provided on a side. And on the front end of the bottom of the card 21, plural contacts 21c are provided in parallel at a constant pitch, and stepped parts 21d are formed on both the sides so as to extend toward the drawing and ejecting directions (arrow directions A, B).

Next, the concrete construction of the components constituting the card connecting unit will be described in order.

As shown in FIG. 5, the body unit 1 is composed of a rectangular housing 2 with the upper end opened, and a board 6 mounted on the housing 2.

The housing 2 is formed of a plastic material, and a motor 3 is fastened therein, as shown in FIG. 6 and FIG. 7. The card insertion slot 2a is formed on the front face, and a worm gear 3a is fit into the spindle of the motor 3.

On a bottom plate 2b of the housing 2, a cutout hole 2c and two cutout holes 2d are bored, and a pair of projections 2e are provided on the upper side so as to extend to the drawing and ejecting directions. A gear housing 2f is formed on the rear side against the cutout hole 2c to protrude upward, whereby gears 4, 5 are housed so as to freely rotate.

The gear 4 is made up with a small gear 4a and a large gear 4b integrally formed on the periphery of the small gear 4a, and the gear 5 is made up with a small gear 5a and a large gear 5b integrally formed on the periphery of the small gear 5a. The large gear 4b of the gear 4 is engaged with the worm gear 3a, and the small gear 4a of the gear 4 is engaged with the large gear 5b of the gear 5. The small gear 5a of the gear 5 is exposed in the housing 2 from a cut part 2g formed on the gear housing 2f.

The board 6 is formed of phenolic resin, and on the upper side thereof, as shown in FIG. 8 and FIG. 9, plural terminal members 7 made of an elastic spring material are supported in a state of cantilever by a block body 8 made of an insulating synthetic resin. Further on the board 6, a connector 9 is mounted in connection with the plural terminal members 7, and two switches 10, 11 are mounted with a spacing in the drawing and ejecting directions (arrow directions A, B).

The board 6 is fastened on the bottom plate 2b of the housing 2 by screwing, and the plural terminals 7 and the switches 10, 11 are located in the housing 2 by way of the cutout hole 2c and cutout holes 2d.

On the other hand, the loading mechanism 12 is made up with, as shown in FIG. 3 and FIG. 10, the fixed plate 13, a drive member 16 placed on the upper side of the fixed plate 13, a movement member 15 placed on the lower side of the fixed plate 13, and an engagement member 19 placed between the fixed plate 13 and the movement member 15 and so forth, which is constructed separately from the body unit 1.

The fixed plate 13 is made of a stainless metal plate and the like. As shown in FIG. 10 through FIG. 12, on the fixed plate 13, a stopper projection 13a is formed on the front thereof, and long hole 13b and two slide holes 13c are formed to extend toward the drawing and ejecting directions (arrow directions A, B). A shaft hole 13d is bored near the rear slide hole 13c, and about the shaft hole 13d is rotatably supported a loading gear 14 having a small gear 14a and a large gear 14b integrally piled up with two steps vertically. Further, the fixed plate 13 has a guide groove 13e bored to extend toward the drawing and ejecting directions (arrow directions A, B), and has a cum groove 13f and a lock groove 13g bored in a row on the way of the guide groove 13e.

Figure 19:
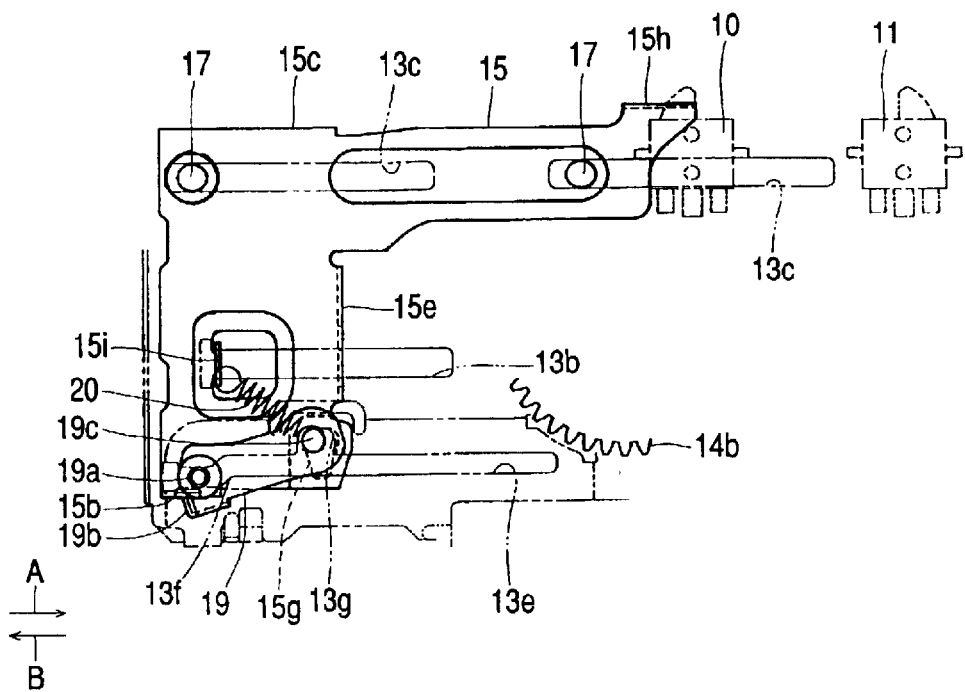
FIG. 19 is an explanatory chart illustrating the positional relation of the movement member and the engagement member in a state of the card being ejected.

The movement member 15 is formed in a L-letter form with a stainless metal plate and the like, which includes, as shown in FIG. 13 through FIG. 15, an upper plate 15a, guide walls 15b, 15c formed by bending both sides of the upper plate 15a downward at a right angle, two small holes 15d bored on the upper plate 15a with a spacing in the drawing and ejecting directions, a receiving part 15e formed by bending an edge downward, and a hole 15f bored on the guide wall 15b. The upper plate 15a is also provided with a potbellied groove 15g, and a pressing part 15h for pressing the switches 10, 11 mounted on the board 6, which is formed by bending. Further, the upper plate 15a has a spring hanger 15i formed by upright bending. As shown in FIG. 19, the spring hanger 15i is fit into the long hole 13b of the fixed plate 13 from below to lie above the fixed plate 13. The potbellied groove 15g overlaps with the lock groove 13g and the guide groove 13e.

The drive member 16 is formed in a plate with a plastic material, and as shown in FIG. 16, a rack gear 16a is formed on the side thereof so as to extend toward the drawing and ejecting directions (arrow directions A, B). Two rectangular holes 16b are bored with a spacing in the drawing and ejecting directions, and a spring hanger 16c is provided between both the rectangular holes 16b. As shown in FIG. 10, the drive member 16 that puts the fixed plate 13 in-between with the movement member 15 is coupled with the movement member 15 by means of two slide pins 17 pressed into the small holes 15d, piercing through the rectangular holes 16b and slide holes 13c. Thereby, the drive member 16 is able to move in one body with the movement member 15 along the slide holes 13c to the drawing and ejecting directions (arrow directions A, B), in a state that the rack gear 16a is engaged with the small gear 14a of the loading gear 14.

The drive member 16 is energized to the ejecting direction (arrow direction B) by a spring 18 hung between the spring hanger 16c and the slide pin 17 on one side, and comes into contact with the stopper projection 13a. Between the slide pins 17 and the inner walls of the rectangular holes 16b is formed a clearance t, which forms a damping mechanism. By this damping mechanism, only the movement member 15 is able to move by the clearance t to the drawing direction (arrow direction A) against the energizing force of the spring 18.

The engagement member 19 is made of a stainless metal plate and the like, and as shown in FIG. 17 through FIG. 19, it has a pivot 19a formed by burring. A pawl 19b is formed by means of bending on one end of the engagement member 19, and a cylindrical fitting part 19c is attached by means of caulking and the like on the other end thereof. As mentioned above, the engagement member 19 is disposed between the fixed plate 13 and the movement member 15. Fitting the pivot 19a into the guide groove 13e of the fixed plate 13, fitting an upper part 19c1 of the fitting part 19c into the lock groove 13g joining to the guide groove 13e, and fitting a lower part 19c2 of the fitting part 19c into the potbellied groove 15g of the movement member 15 regulates the position of the engagement member 19 through the guide groove 13e. Thereby, the engagement member 19 is disposed to be able to rotate about the pivot 19a to the upper plate 15a of the movement member 15. As shown in FIG. 10, the fitting part 19c is engaged with the lock groove 13g by the energizing force of a return spring 20 to pull the engagement member 19, of which both ends are hooked onto the upper part 19c1 of the fitting part 19c and the spring hanger 15i of the movement member 15 above the fixed plate 13 (refer to FIG. 19).

And, by fixing the fixing plate 13 to the housing 2 by using an appropriate means such as hook and hold, the loading mechanism 12 formed into a unit is supported on the upward opening end of the body unit 1, and as shown in FIG. 1 through FIG. 3, the large gear 14b of the loading gear 14 provided to the loading mechanism 12 is engaged with the small gear 5a of the gear 5 provided to the body unit 1. Thereby, a card path is made in a space that extends to the drawing and ejecting directions (arrow directions A, B), which is surrounded by the bottom plate 2b of the housing 2, the upper plate 15a, and the guide walls 15b, 15c of the movement member 15. As shown in FIG. 19, the fitting part 19c of the engagement member 19 is located on the card path in a state of the card being ejected.

Figure 20:
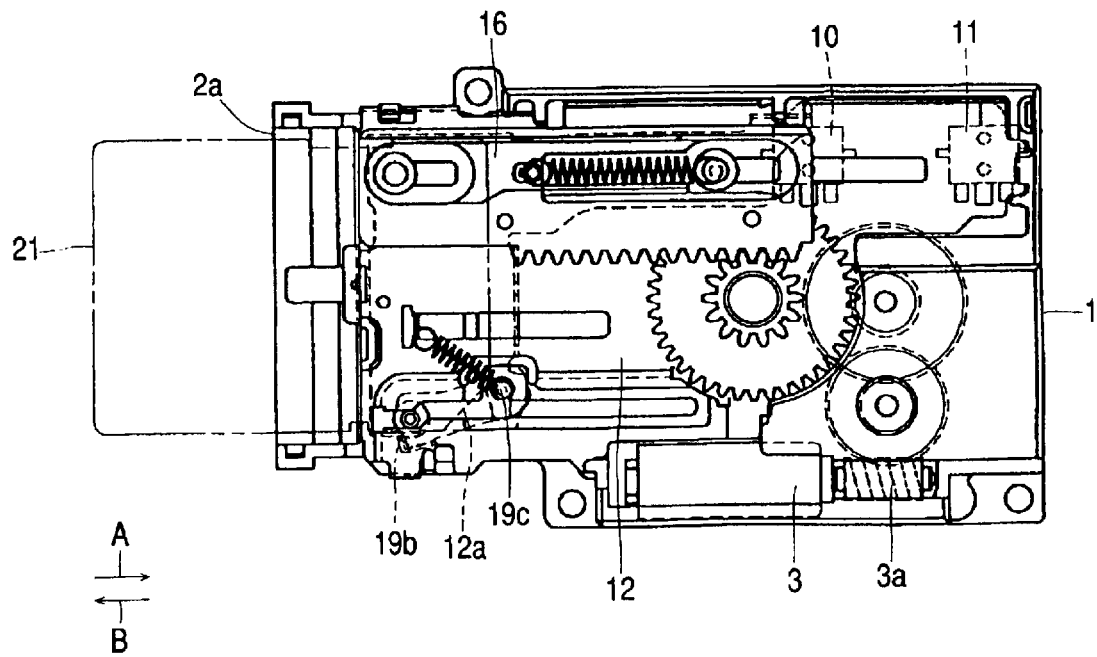
FIG. 20 is a plan view in a state of the card being inserted into the card connecting unit.
Figure 21:
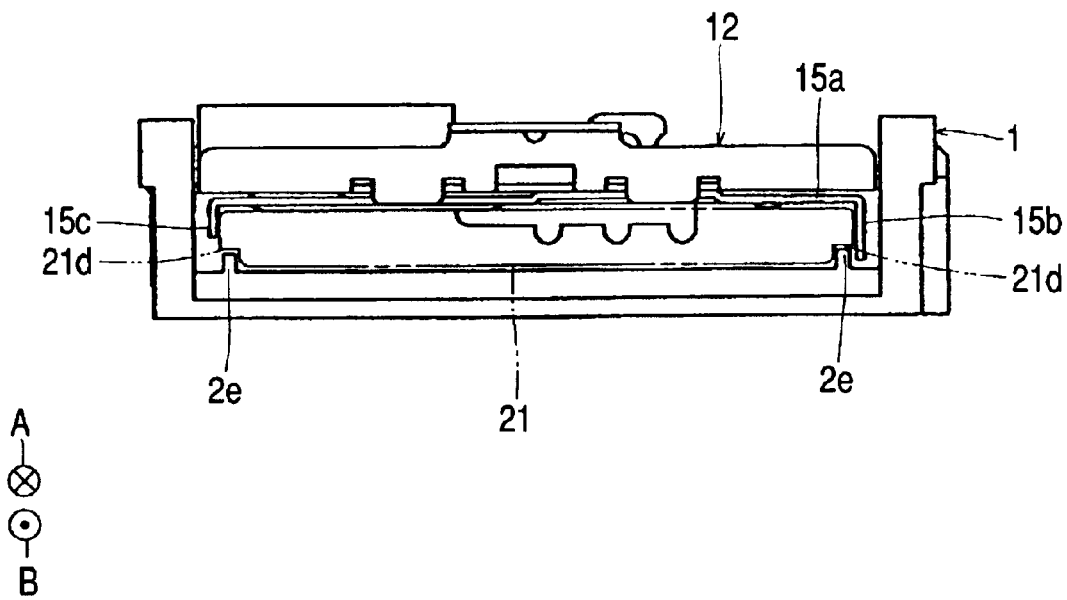
FIG. 21 is a front view in the above state.
Figure 22:
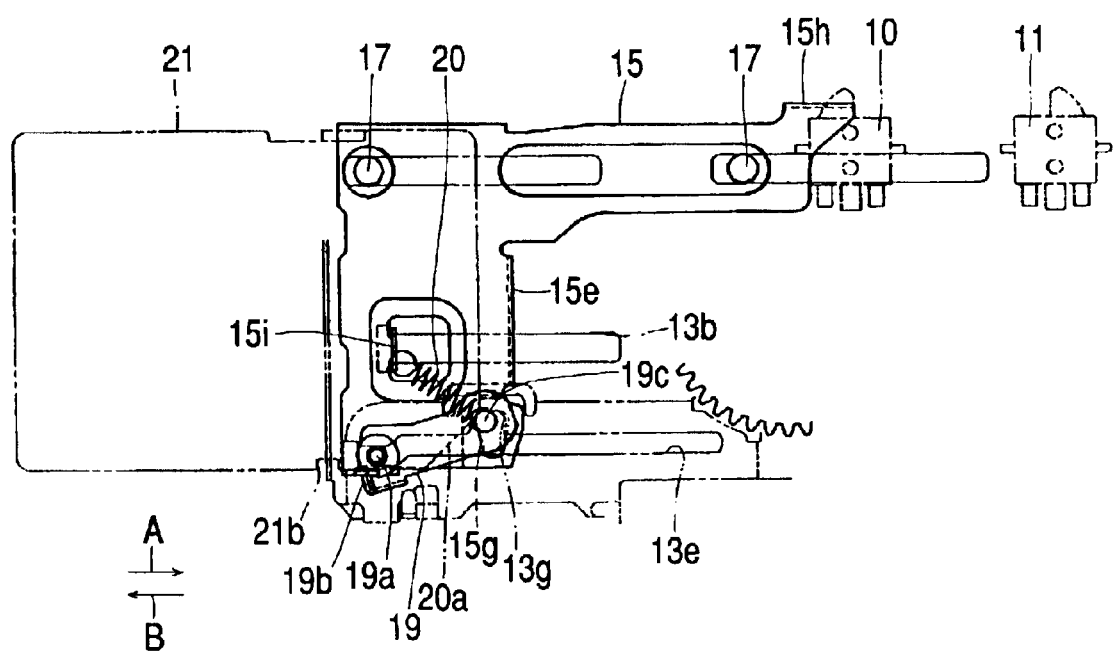
FIG. 22 is an explanatory chart illustrating the relation of the card and the loading mechanism in FIG. 20.
Figure 23:
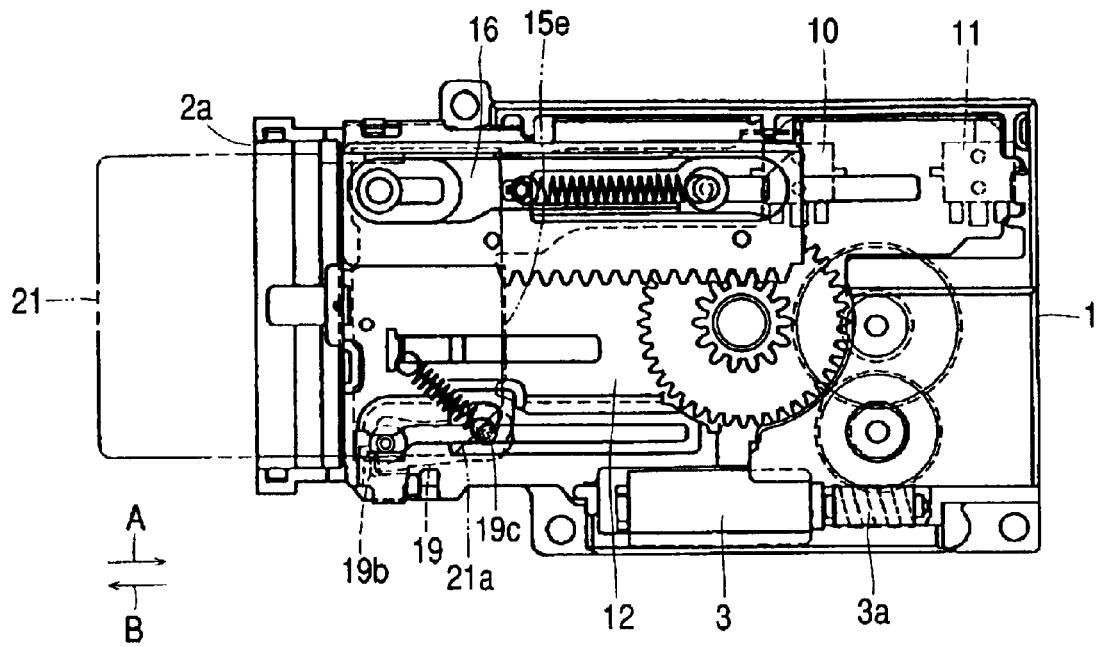
FIG. 23 is a plan view in a state of the card being further inserted into the card connecting unit.
Figure 24:
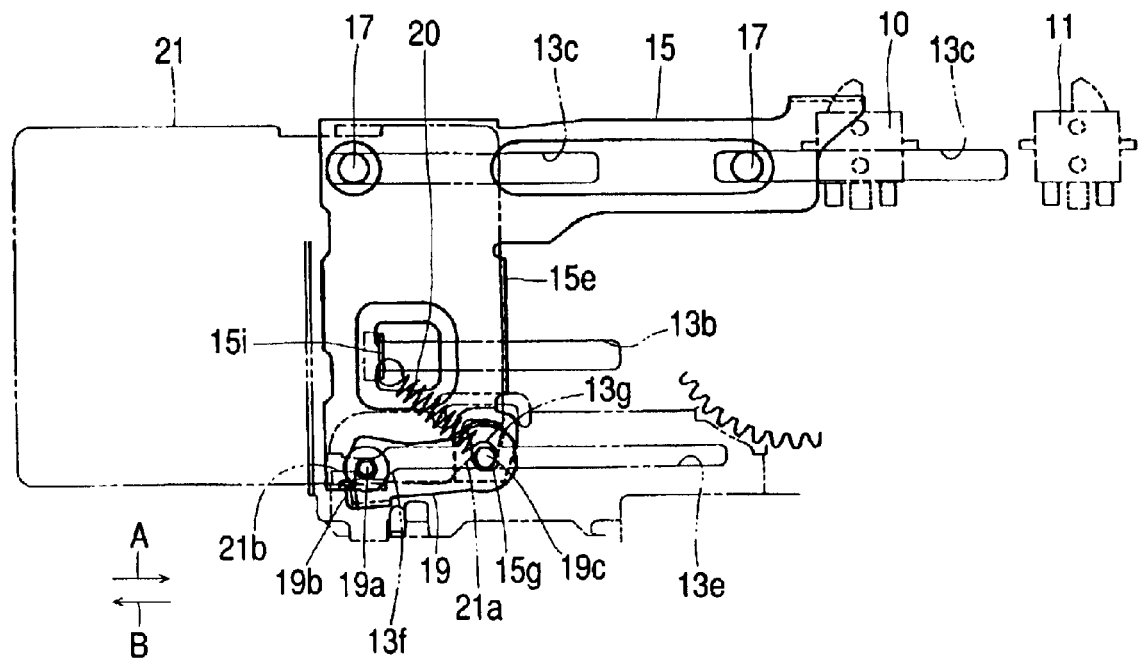
FIG. 24 is an explanatory chart illustrating the relation of the card and the loading mechanism in FIG. 23.
Figure 25:
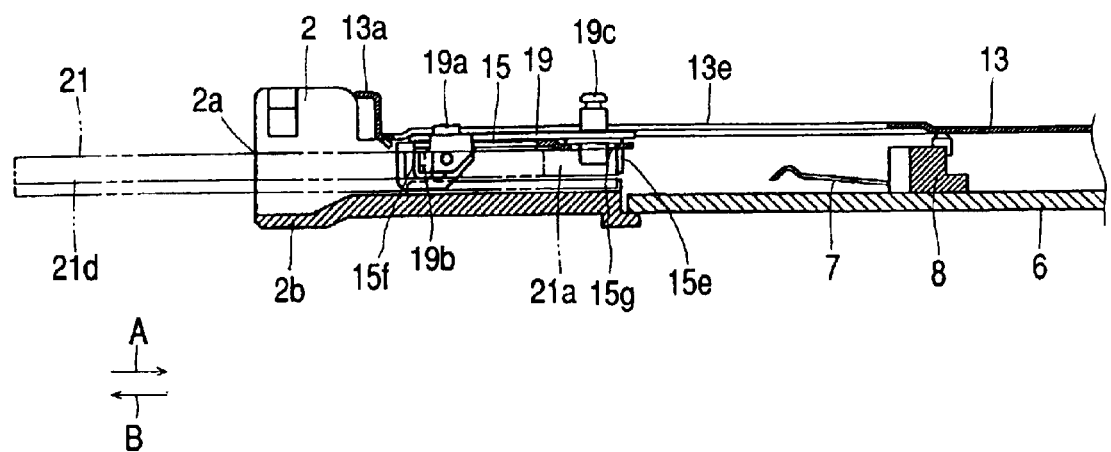
FIG. 25 is an explanatory chart illustrating the relation of the card and a terminal member in FIG. 23.
Figure 26:
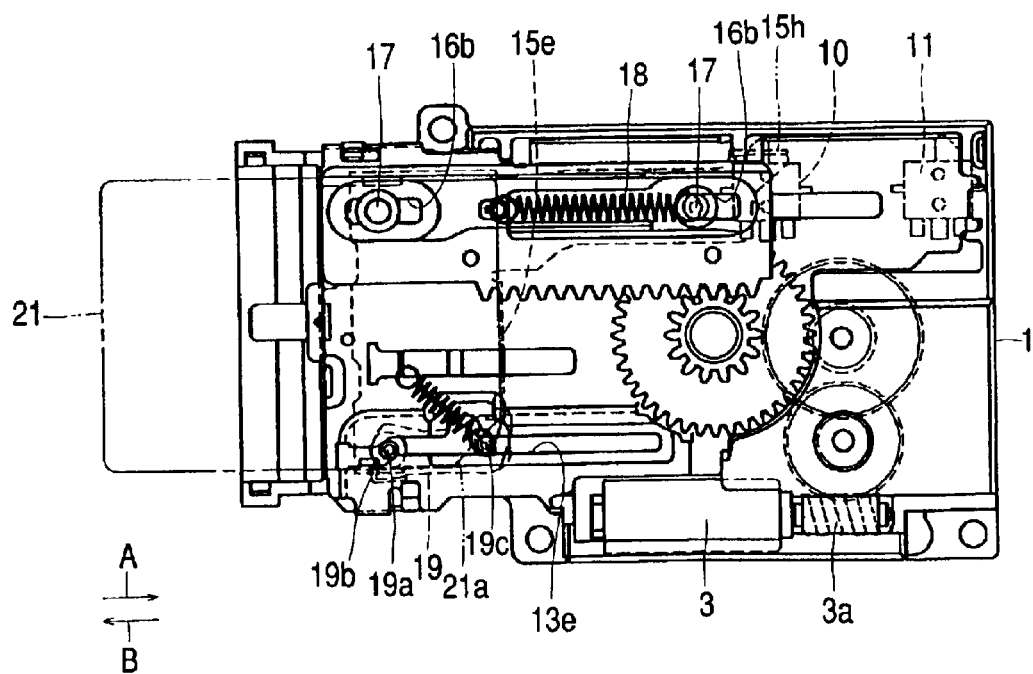
FIG. 26 is a plan view in a state of the card being further pushed into the card connecting unit.
Figure 27:
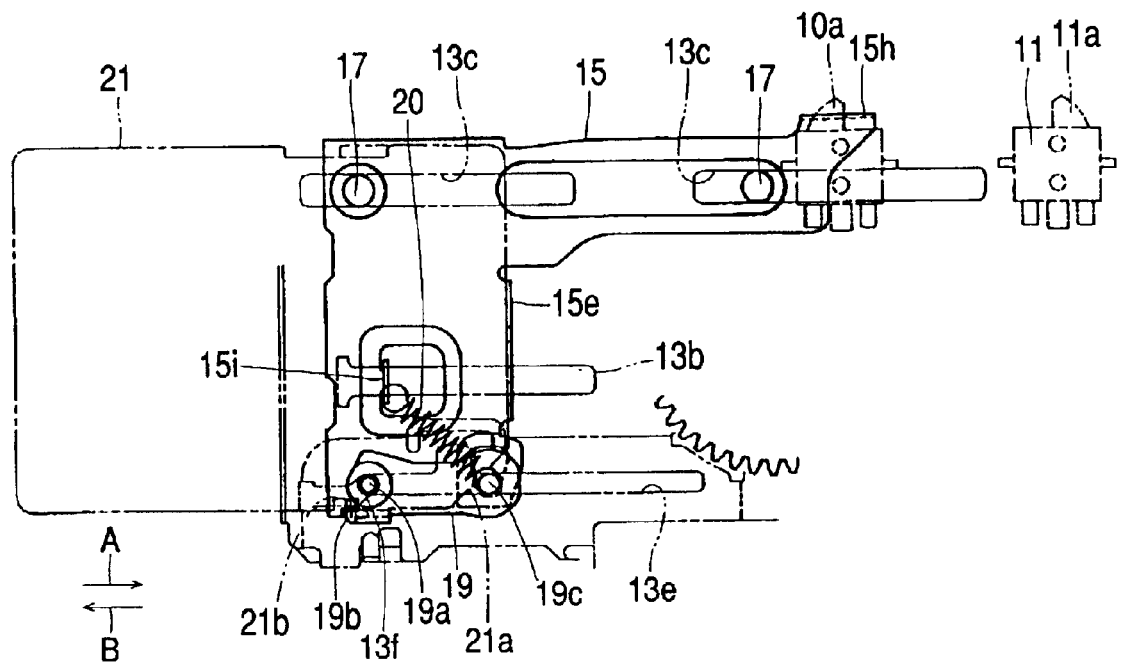
FIG. 27 is an explanatory chart illustrating the relation of the card and the loading mechanism in FIG. 26.
Figure 28:
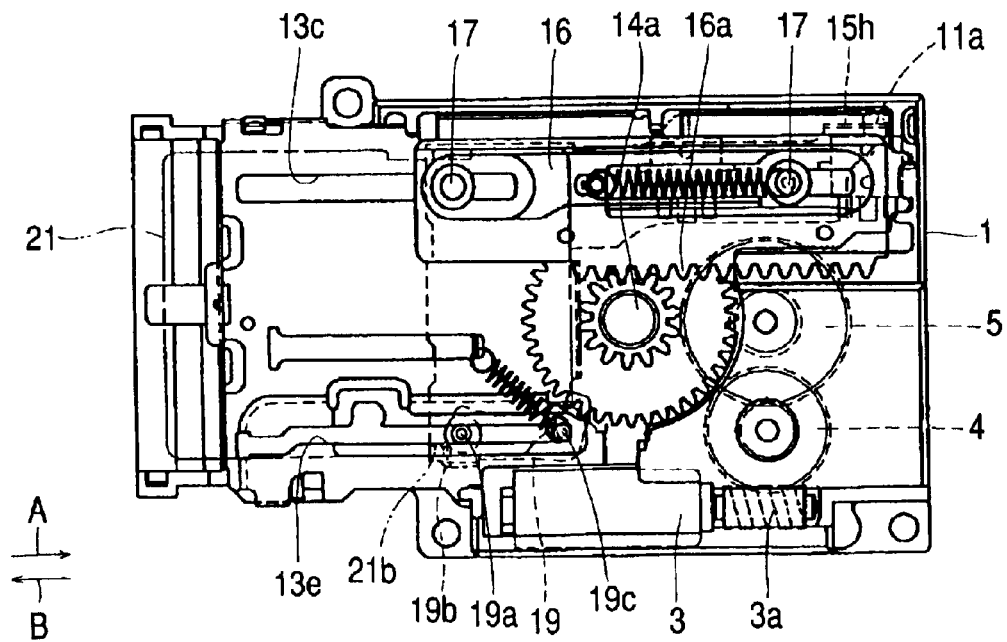
FIG. 28 is a plan view in a state of the card being completely drawn into the card connecting unit.
Figure 29:
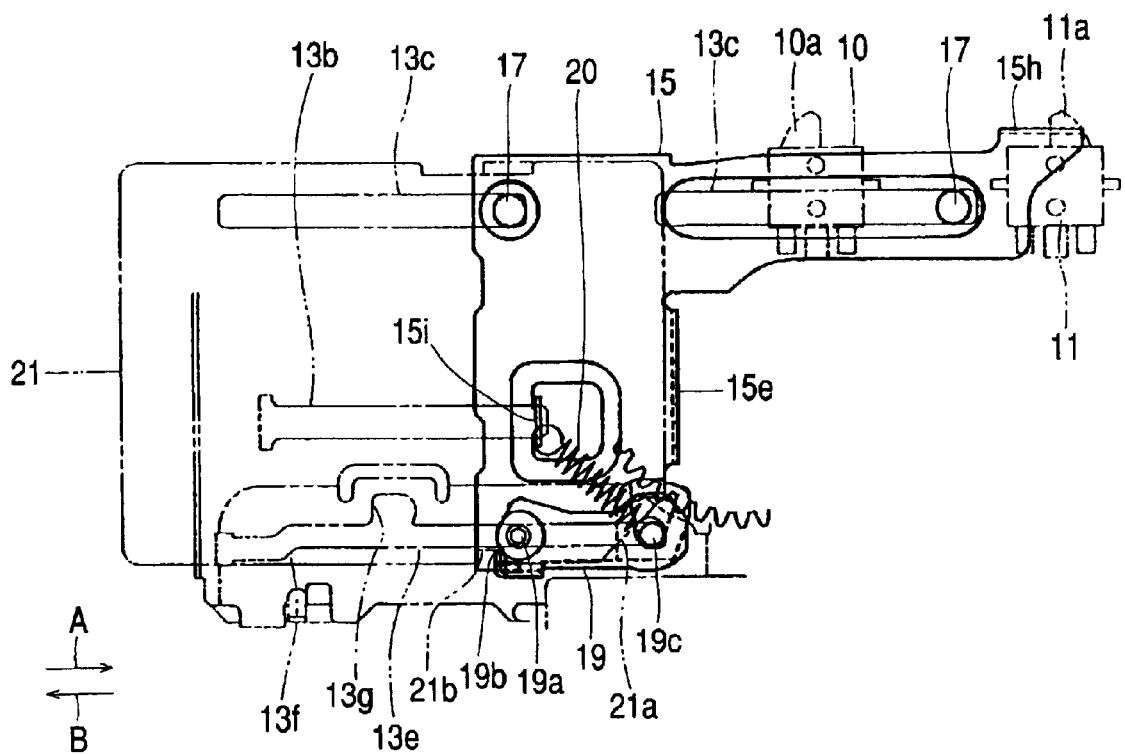
FIG. 29 is an explanatory chart illustrating the relation of the card and the loading mechanism in FIG. 28.
Figure 30:
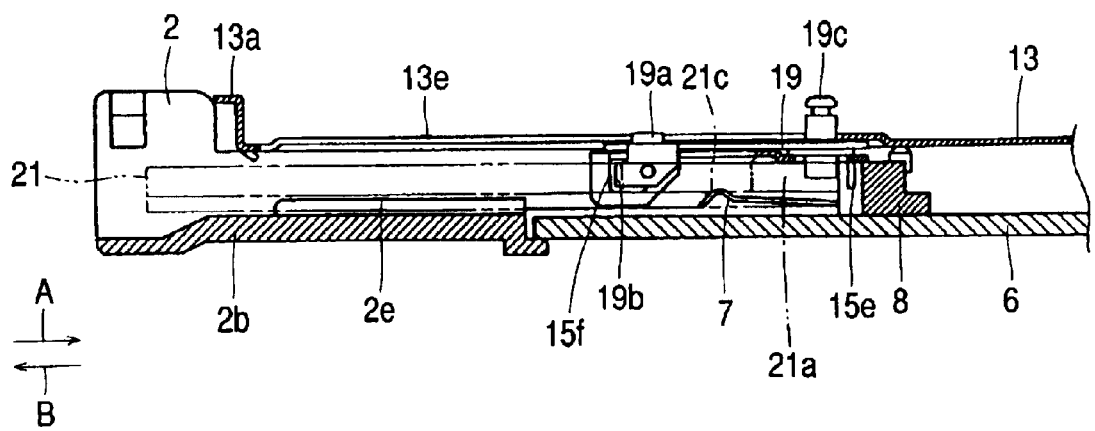
FIG. 30 is an explanatory chart illustrating the relation of the card and the terminal member in FIG. 28.
Figure 31:
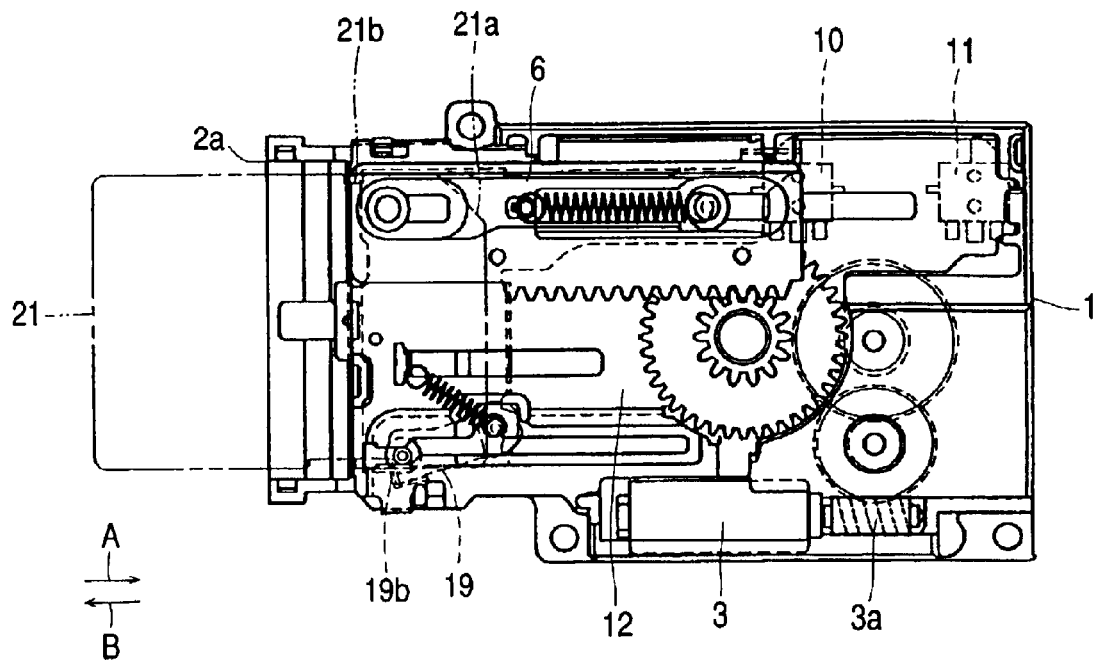
FIG. 31 is a plan view in a state of the card being wrongly inserted into the card connecting unit.

The card connecting unit relating to the embodiment is constructed as mentioned above, and the operation thereof will now be described. FIG. 20 is a plan view in a state of the card being inserted into the card connecting unit; FIG. 21, a front view of the above; FIG. 22, an explanatory chart illustrating the relation of the card and the loading mechanism in FIG. 20; FIG. 23, a plan view in a state of the card being further inserted into the card connecting unit; FIG. 24, an explanatory chart illustrating the relation of the card and the loading mechanism in FIG. 23; FIG. 25, an explanatory chart illustrating the relation of the card and the terminal member in FIG. 23; FIG. 26, a plan view in a state of the card being further pushed into the card connecting unit; FIG. 27, an explanatory chart illustrating the relation of the card and the loading mechanism in FIG. 26; FIG. 28, a plan view in a state of the card being completely drawn into the card connecting unit; FIG. 29, an explanatory chart illustrating the relation of the card and the loading mechanism in FIG. 28; FIG. 30, an explanatory chart illustrating the relation of the card and the terminal member in FIG. 28; FIG. 31, a plan view in a state of the card being wrongly inserted into the card connecting unit; and FIG. 32, an explanatory chart illustrating the relation of the card and the loading mechanism in FIG. 31.

The card connecting unit is used in a manner that it is attached to equipment such as a computer, the plural terminals 7 are connected to the recording/reproducing unit of the equipment, and the switches 10, 11 are connected to the control unit of the equipment by way of the connector 9.

And, as shown in FIG. 20 through FIG. 22, when the card 21 is inserted in the card insertion slot 2a, and when the card 21 is drawn into the body unit 1 along the card path to the drawing direction (arrow direction A), the card 21 is guided by the guide walls 15b, 15c and a pair of the projections 2e, and the slant 21a of the card 21 comes into contact with the fitting part 19c of the engagement member 19.

When the card 21 is further inserted into the body unit 1, as shown in FIG. 23 through FIG. 25, the slant 21a of the card 21 presses the fitting part 19c, the engagement member 19 turns clockwise about the pivot 19a to resist the energizing force of the return spring 20, the fitting member 19a is disengaged from the lock groove 13g of the fixed plate 13 into the guide groove 13e, thus moving to the direction of departing from the card path, whereby the insertion of the card 21 is permitted, and the front end of the card 21 comes into contact with the receiving part 15e of the movement member 15.

When the card 21 is further pressed into the body unit 1, as shown in FIG. 26 and FIG. 27, the front end of the card 21 presses the receiving part 15e, only the movement member 15 moves to the drawing direction (arrow direction A) by the clearance t against the energizing force of spring 18, because of the aforementioned damping mechanism. Accompanied with this move, the slant 21a of the card 21 presses the fitting part 19c, and the engagement member 19 moves together with the movement member 15 along the guide groove 13e to the drawing direction (arrow direction A). While the pivot 19a passes through the cam groove 13f, the engagement member 19 turns clockwise, serving the fitting part 19c as a fulcrum, and the pawl 19b is engaged with the recess 21b of the card 21 through the hole 15f provided on the guide wall 15b of the movement member 15.

While the movement member 15 moves, the pressing part 15h of the movement member 15 presses an actuator 10a of the switch 10 to bring the switch 10 into switching operation; and thereby the move of the movement member 15 is detected, and the motor 3 is powered on the basis of this detection. And then, the rotation of the spindle of the motor 3 is transmitted through the worm gear 3a and the gears 4, 5 to rotate the loading gear 14 clockwise. The rotation of the loading gear 14 is converted into a linear movement by the engagement with the rack gear 16a, and the drive member 16 moves together with the movement member 15 to the drawing direction (arrow direction A).

Accompanied with this move, the engagement member 19 moves to the drawing direction interlocking with the move of the movement member 15, by the fitting part 19c being engaged with the groove 15g of the movement member 15, and thereby the card 21 engaged with the pawl 19b moves together with the movement member 15 to the drawing direction to be drawn into the body unit 1. During this drawing process, since both sides of the card 21 come in contact with the guide walls 15b, 15c of the movement member 15, the card 21 is conveyed in the card path without tilting to the drawing direction.

And as shown in FIG. 28 through FIG. 30, the pressing part 15h of the movement member 15 presses an actuator 11a of the switch 11 to bring the switch 11 into switching operation, and this switching operation cuts off the power supply to the motor 3. Thereby, the move of the drive member 16 to the drawing direction stops, and the card 21 is retained in the body unit 1 in a state of being kept engaged with the pawl 19b of the engagement member 19. Immediately before the power supply to the motor 3 is cut off, the plural terminals 7 supported on the board 6 in a cantilever state are pressed down by the front end of the card 21. After the power supply to the motor 3 is cut off, the free ends of the plural terminals 7 come in elastic contact with the contacts 21c of the card 21.

After the contacts 21c of the card 21 are connected to the recording/reproducing unit of the equipment by means of the plural terminals 7, the writing/reading of information is executed from the recording/reproducing unit to the card 21 through the plural terminals 7.

In the case the card 21 is ejected out of the body unit 1, in a state as shown in FIG. 28 through FIG. 30, when the motor 3 is powered by operating a separately provided power switch, the rotation of the spindle of the motor 3 is transmitted through the worm gear 3a and the gears 4, 5 to conversely rotate the loading gear 14 counterclockwise. Then, the drive member 16 moves together with the movement member 15 to the ejecting direction (arrow direction B), and the receiving part 15e of the movement member 15 presses the card 21 to move to the ejecting direction together with the movement member 15. And, the pressing part 15h of the movement member 15 presses the actuator 10a of the switch 10 to put the switch 10 into switching operation. This switching operation cuts off the power supply to the motor 3, and the move of the drive member 16 to the ejecting direction stops, which presents a state illustrated in FIG. 26, FIG. 27.

In this state, the movement member 15 further moves to the ejecting direction together with the card 21 and the engagement member 19 by the energizing force of the spring 18. In the process of this move, the pivot 19a passes through the cam groove 13f to thereby turn the engagement member 19 counterclockwise, serving the fitting part 19c as a fulcrum, and to disengage the pawl 19b from the recess 21b of the card 21, which presents a state illustrated in FIG. 23 through FIG. 25. Then, the engagement member 19 turns counterclockwise about the pivot 19a by the energizing force of the return spring 20, and being pressed by the fitting part 19c that moves toward the lock groove 13g from the guide groove 13e, the card 21 further moves to the ejecting direction, leading to a state illustrated in FIG. 20 through FIG. 22. In this state, the operator is able to pull out the card 21 from the card insertion slot 2a.

Figure 32:
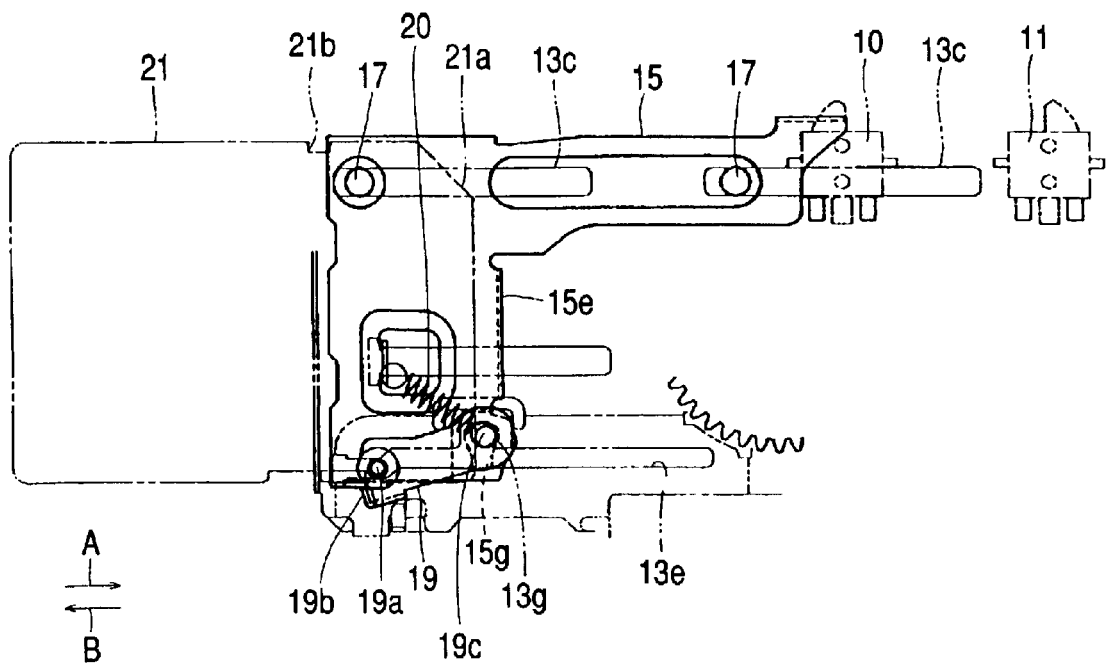
FIG. 32 is an explanatory chart illustrating the relation of the card and the loading mechanism in FIG. 31.

Further, in the case that the card 21 is wrongly inserted into the card insertion slot 2a such as inside out and upside down, as shown in FIG. 31 and FIG. 32, the engagement of the fitting part 19c with the lock groove 13g is maintained, and the fitting part 19c receives the front end of the card 21, which makes it impossible to push the card 21 inside any more. Thus, it is possible to prevent the damage of the body unit 1 resulting from a wrong insertion of the card 21.

The embodiment being thus implemented, the invention exhibits the effects as follows.

In the card connecting unit of the invention, the loading mechanism includes a movement member that moves to the drawing direction and the ejecting direction of the card by means of power of the drive motor, and an engagement member provided to the movement member so as to engage with and disengage from a recess of the card; and the engagement member is engaged with the recess of the card to thereby move the card together with the movement member to the drawing direction and the ejecting direction. Since it is constructed in this manner, the loading mechanism is able to smoothly and reliably draw and eject the card. Accordingly, the conventional carriage roller becomes unnecessary, which realizes to make the whole unit thinner.

The construction is made to provide the engagement member rotatably around a pivot, to form a pawl to engage with the recess of the card on one end of the engagement member with the pivot placed in between, to form on the other end a fitting part to engage with a groove formed on the movement member, and to provide an energizing member that energizes the engagement member to a direction such that the pawl disengages from the recess; it is also made such that, when the fitting part is pressed by the front end of the card inserted into the card insertion slot, the engagement member turns to a direction such that the pawl engages with the recess against an energizing force of the energizing member. Since the construction is made in a simple manner like this, it is possible to smoothly and reliably draw and eject the card, and also possible to reduce the number of components to a great extent, thus achieving the lowering of the cost.

Further, when the fitting part is pressed by the front end of the card inserted into the card insertion slot, the fitting part disengages from the lock groove to move to the guide groove, and when the movement member moves to the drawing direction by a force to insert the card, the fitting part and the pivot move to the drawing direction along the guide groove, and when the pivot passes through the cam groove, the pawl moves to a direction such that it engages with the recess of the card, and engages with the recess. Since the construction is thus made, it is possible to regulate the operation timings of the related members, and to correctly draw and eject the card at any time, without disengaging the engagement member from the recess of the card on the way of the drawing operation.

Further, since the construction is made such that the fitting part provided to the engagement member obstructs the insertion of the card when the card is wrongly inserted, it is not necessary to provide a mechanism for preventing wrong insertion of the card separately from the loading mechanism, and the whole structure of the unit can be simplified to promote lowering of the cost.

Further, the card connecting unit includes: a rack gear provided movably in a body with the movement member; a loading gear engaged with the rack gear and driven to rotate by the drive motor, which moves the movement member to the drawing direction; a damping mechanism that presses to move the movement member by a predetermined distance to the drawing direction by the card inserted into the insertion slot; and a switch that detects the predetermined amount of movement of the movement member to start the drive motor. Owing to this construction, a satisfactory feeling with pressure can be realized when the card is inserted, and secure movement of the loading mechanism can be achieved by means of detecting insertion of the card.

What is claimed is:

1. A card connecting unit comprising:

a loading mechanism that draws a card inserted in a card insertion slot into a body unit and ejects the card outside of the body unit from the card insertion slot;

a drive motor that drives the loading mechanism; and a plurality of terminal members that come in contact with a plurality of contacts of the card drawn into the body unit by the loading mechanism, wherein the loading mechanism includes a movement member that moves to a drawing direction and an ejecting direction of the card by means of power of the drive motor, and an engagement member provided to the movement member so as to engage with and disengage from a recess of the card;

wherein the engagement member is engaged with the recess of the card to thereby move the card together with the movement member to the drawing direction;

wherein the movement member is provided with a receiving part which comes into contact with a front end of the card, and is pressed and moved to the drawing direction after the card comes into contact with the receiving part; and wherein a switch which detects the movement of the movement member to the drawing direction to start the drive motor is provided.

2. A card connecting unit according to claim 1, wherein the engagement member is provided rotatably around a pivot, wherein on one end thereof a pawl to engage with the recess of the card is formed with the pivot placed in between, wherein on another aid thereof a fitting part to fit a groove formed on the movement member is formed, and wherein an energizing member is provided which energizes the engagement member to a direction such that the pawl disengages from the recess; and wherein when the fitting part is pressed by a front end of the card inserted into the card insertion slot, the engagement member turns to a direction such that the pawl engages with the recess against an energizing force of the energizing member.

3. A card connecting unit according to claim 2, wherein:

the loading mechanism includes a fixed plate fastened to the body unit, and wherein the fixed plate includes a guide groove to extend to the drawing direction, which the pivot is fit into, as well as a cam groove and a lock groove with which the fitting part is engaged in a state of the card being ejected, which are formed in a row along the guide groove;

wherein when the fitting part is pressed by the from end of the card inserted into the card insertion slot, the fitting part disengages from the look groove to move to the guide groove, and wherein when the movement member moves to the drawing direction by a force to insert the card, the fitting part and the pivot move to the drawing direction along the guide groove; and wherein when the pivot passes through the cam peeve, the pawl moves to a direction such that the pawl engages with the recess of the card, and engages with the recess.

4. A card connecting unit according to claim 2, wherein the fitting part is energized by the energizing member in a state of the card being ejected, and is located on a card path inside the body unit, wherein when the card is correctly inserted into the card insertion slot, by being pressed on a slant of the front end of the card, the fitting part moves to a direction such that the fitting part deviates from the card path, which permits insertion of the card, and wherein when the card is wrongly inserted, the fitting part comes in contact with the front end of the card to obstruct the insertion thereof.

5. A card connecting unit according to claim 2, further comprising:

a rack gear provided movably in a body with the movement member;

a loading gear engaged with the rank gear and driven to rotate by the drive motor, which moves the movement member to the drawing direction; and a damping mechanism that presses to move the movement member by a predetermined distance to the drawing direction by the card inserted into the insertion slot.

* * * * *